3,467,580
ALKYLAMIDE-WATER DISTILLATION AND
AMINE NEUTRALIZATION OF ACID FORMED
Edouard J. Weisang, Le Havre, and Jean D. Maurin,
Gainneville, France, assignors to Compagnie Francaise
de Raffinage, Paris, France
Filed Aug. 8, 1966, Ser. No. 571,122
Claims priority, application France, Aug. 12, 1965,
28,185
Int. Cl. B01d 3/00; C07b 5/00
U.S. Cl. 203—14          8 Claims

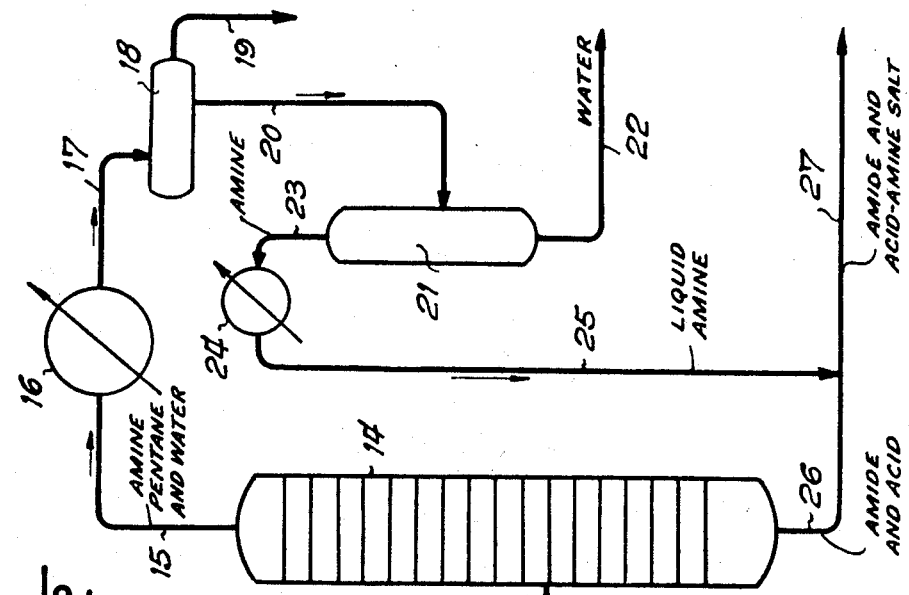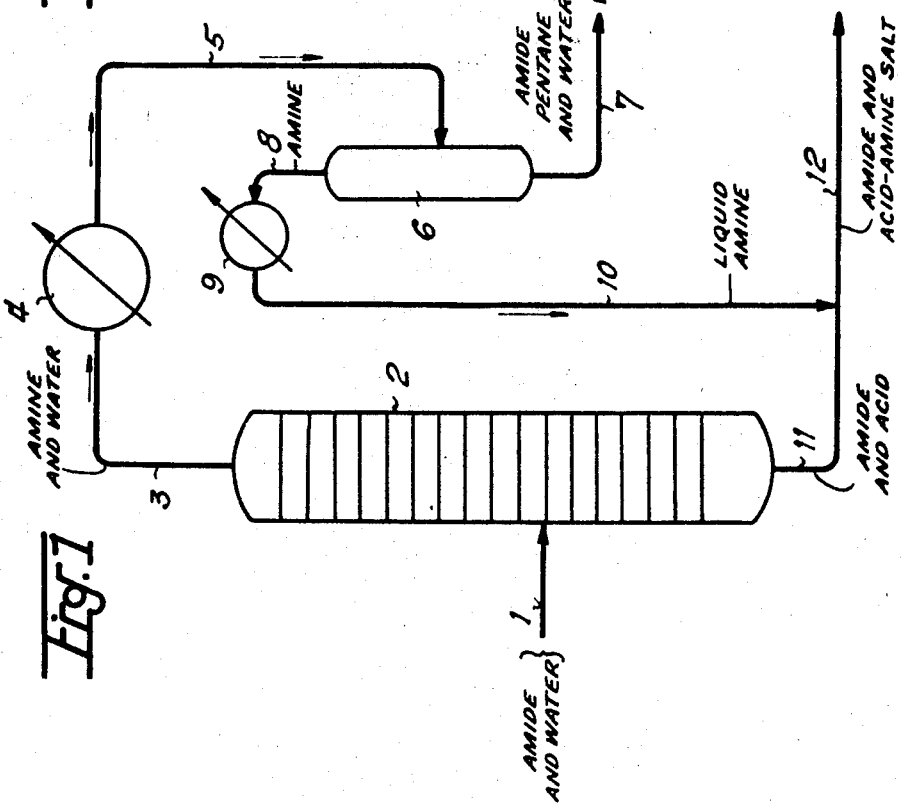

ABSTRACT OF THE DISCLOSURE

When using alkylamides as extraction solvents in various extraction processes, recovery of the alkylamide solvent for reuse is provided in accordance herewith, particularly the enhanced separation thereof from water, by distillation, which inevitably produces some hydrolysis of the alkylamide into an alkylamine and a carboxylic acid. Such hydrolysis inevitably wastes alkylamide, and such waste is minimized in accordance herewith by admixing into the recovered distillate the alkylamine formed by such hydrolysis to provide both a neutralization of the acid component (forming an amine salt) and an equilibrium situation which stabilizes against additional hydrolysis of the alkylamide so that it may be effectively recovered for reuse as a solvent with less hydrolysis loss and without additional purification steps.

---

This invention relates to the recovery of alkylamides from mixtures thereof with water and, more particularly, to the recovery of such materials in relatively pure form and high yields by distillation techniques notwithstanding hydrolysis reactions which may occur during distillation.

As is well understood, the alkylamides, and more particularly monomethylformamide and dimethylformamide, are well known as good solvents for a variety of organic compositions. Notably, dimethylformamide has been employed in refining mineral oils, extracting petroleum fractions, separating olefins and diolefins and acetylenic hydrocarbons present in saturated hydrocarbons, etc. Similarly, that compound has been used for the desulphurization of petroleum distillates and for other extracting processes, among which may be noted particularly the extracting of chlorinated derivatives of hydrocarbons from mixtures thereof with the unchlorinated hydrocarbons themselves such as disclosed, for example, in co-pending application S.N. 483,392 filed Aug. 26, 1965.

Naturally, in such solvent and extracting or separating processes, the involved economics depend to a significant extent on the recovery of the alkylamide solvent for reuse, particularly with commercial scale operations, which recovery is preferably to be accomplished as completely as possible with the solvent in relatively pure state. Frequently, however, with such extracting or other processes using alkylamides as solvents, the solvent comes in contact, or is admixed, with water at some stage. Thus, to separate the products extracted by the solvent, the extract phase may be diluted with water and/or other solvents such as hydrocarbons, and traces of the alkylamide solvent may be removed from the final raffinate by washing with water.

When recovering such alkylamide solvents for re-use or recycling in such processes, it may be necessary or desired to eliminate therefrom the water with which they were admixed in order to maintain the greatest solvent power for use in the basic process, and such water elimination may frequently be attempted by distillation. Unfortunately, distillation of a mixture of water and alkylamides is accompanied by a partial hydrolysis of the alkylamide into the corresponding carboxylic acid and alkylamine. Thus, the distillation of a mixture of water and dimethylformamide produces by hydrolysis formic acid and dimethylamine, so that the latter leaves the head of the distillation with the water and the formic acid remains in the dimethylformamide fraction recovered at the bottom of the column.

As will be understood, such reactions produce a number of disadvantageous or uneconomical conditions with distillation recoveries of alkylamide materials from water mixtures. For example, there is an irreversible loss of the solvent itself, according to how much of it is hydrolized during the distillation. Similarly, the build-up of formic acid in the dimethylformamide fraction may readily attain a level which increases the acidity of that fraction sufficiently to produce undesired corrosion in all the apparatus of the whole process, including that in which the solvent is used in the first place and especially upon repeated recycling thereof, as well as, in some cases, producing an actual acceleration of decomposition of the dimethylformamide solvent because of catalytic action by the decomposition products and products of corrosion caused by the formic acid. Aside from other considerations, the necessity of utilizing corrosion-resistant apparatus for the original extraction process may substantially increase the cost thereof.

If it is attempted to avoid the above-noted disadvantages by, for example, taking advantage of the fact that dimethylformamide forms an azeotropic mixture with formic acid having a maximum boiling point, still certain disadvantageous and uneconomical conditions obtain. For example, such an azeotrope is eliminated at the very bottom of a distillation column, so that relatively pure dimethylformamide is readily recovered in vapor phase a few plates above the bottom of the column. Nevertheless, although the disadvantage of increased acidity in the recycling solvent is avoided by such recovery technique, there are still inevitable and substantial losses of dimethylformamide, both from that portion which is hydrolized to dimethylamine and from that portion which is contained and discarded in the azeotropic mixture.

According to this invention, by contrast, there are provided methods and techniques for the recovery of alkylamides from mixtures thereof with water and by distillation wherein increased acidity of the recovered phase is avoided, as well as avoiding losses of the alkylamide solvent because of hydrolysis during distillation or otherwise. Such results are accomplished in accordance herewith by admixing the alkylamine produced by hydrolysis of the alkylamide during distillation into the mixture of alkylamide and carboxylic acid withdrawn from the bottom of the distillation column, with the result that the acidity of such fraction is substantially neutralized by the added alkylamine so that such recovered fractions can be directly recycled, substantially without additional treatment, into whatever basic or original process utilized the alkylamide solvent in the first place. Thus, there is substantially eliminated both excess acidity and loss of solvent during recovery, with the alkylamine forming the corresponding salt with the acid present, which salt is generally soluble in the alkylamide without substantially diminishing the solvent power thereof for the original or basic process in which the solvent is being used. As a further feature of this invention, the desired recovery of alkylamide solvent is also achieved even when the alkylamide-water mixture also includes other solvent components such as, for example, paraffinic hydrocarbons, and the like.

With the foregoing and additional objects in view, this invention will now be described in more detail, and other objects and advantages will be apparent from the following description, the accompanying drawings, and the appended claims.

In the drawings, FIGS. 1 and 2 are schematic or diagrammatic flow-sheet illustrations of apparatus and process steps embodying and for practicing the solvent recovery techniques hereof in illustrative situations in which the mixtures from which alkylamide solvent is to be recovered contain, in FIG. 1, alkylamide and water and, in FIG. 2, those two components plus an additional immiscible solvent component.

Although the following description utilizes, as purely illustrative, dimethylformamide and the reactions incident thereto to disclose this invention in more detail, satisfactory results have been achieved in accordance herewith in the recovery of other amides from water mixtures, and this invention is to be considered as similarly applicable to such other materials such as, for example, formamide, alkylformamides (monomethylformamide, mono- and di-ethylformamide, monopropylformamide, etc.), alkylacetamides, and, indeed, virtually any alkylamide material which, upon hydrolysis, produces amines having boiling points less than that of water.

With such materials and in accordance herewith, it has been found that the addition of the amine which is formed by hydrolysis of an alkylamide-water mixture during distillation thereof substantially neutralizes, in quantitative terms, the corresponding acid formed from such alkylamide by the hydrolysis, rendering the resulting mixture sufficiently neutral for re-use in a solvent extraction or other process substantially without additional treatment, and that the salt of the amine-acid mixture, at least in the low concentrations encountered in accordance herewith, has little or no significant effect on the solvent power of the alkylamide material for the particular processes in which it is being used, such as those mentioned above. For example, the addition of dimethylamine, resulting from the hydrolysis of dimethylformamide during distillation, to the dimethylformamide fraction recovered from the bottom of the distillation column (and containing formic acid produced by the hydrolysis) directly produces satisfactory results and, quite unexpectedly, the reaction product of dimethylamine and formic acid (the formate of dimethylamine) has been found in accordance herewith to be substantially without significant influence on the solvent power of dimethylformamide.

Again considering dimethylformamide as illustrative of this invention, the equilibrium quantity of that solvent which will be hydrolyzed under conditions obtaining in a distillation column in which one is separating dimethylformamide from water corresponds to approximately 10% by volume of the water present. Generally such water volumes run about 5% to 10% by volume of the total mixture being treated, so that about 0.5% to 1% of the dimethylformamide present is hydrolyzed to form dimethylamine and formic acid, with the former being withdrawn from the top of the distillation column along with water. Separation of the dimethylamine from water (preferably, for example, by simple distillation) yields a dimethylamine fraction which is added directly, in accordance herewith, to the mixture of dimethylformamide and formic acid being withdrawn from the bottom of the distillation tower in substantially anhydrous condition and at ambient temperature. Under these conditions, the dimethylamine neutralizes the formic acid, forming about 0.5% to 1% of the formate of the amine, which readily dissolves in dimethylformamide but, at least in such minor concentrations, without significant influence on the solvent properties thereof. At normal temperatures, such a composition does not react to produce dimethylformamide and water, or, at least, the reaction rate of such transformation is too low to be substantially significant under such conditions, and there is substantially no significant loss of solvent.

Thus, the preferred cycle embodying and for practicing this invention using dimethylformamide as illustrative is to distill the mixture of water and dimethylformamide, withdraw therefrom the dimethylamine formed and separate it from water, add such dimethylamine to the remaining mixture of dimethylformamide and formic acid to form the formate therein for neutralizing the formic acid to produce an equilibrium mixture comprising the formate of dimethylamine and formic acid in equilibrium with dimethylformamide and water. In a subsequent recycling, then, new quantities of dimethylformamide are hydrolyzed into formic acid and dimethylamine, but, when such additional dimethylamine is returned to the old mixture, essentially the same equilibrium among formic acid, dimethylamine, and dimethylformamide is established in a substantially neutral condition while still maintaining the high solvent power of the dimethylformamide. In this manner, there is substantially no significant loss of solvent, and the only parts of any of the apparatus which must be especially corrosion-resistant is the bottom of the distillation tower where the formic acid is present prior to neutralization, and dimethylamine-formate mixture comprises only a very minor proportion of the dimethylformamide solvent phase in a substantially constant equilibrium quantity which exercises little or no effect on the solvent power or properties desired. The separation of dimethylamine from the water mixture withdrawn at the top of the distillation column is quite simply accomplished in known manner and with considerable efficiency because, for example, of the widely different boiling points of these substances (dimethylamine boiling at about 7° C.).

As further illustrative of this invention, reference may be had to FIG. 1 of the accompanying drawing which shows a diagrammatic or flow-sheet representation of a technique embodying and for practicing this invention. A mixture of water and dimethylformamide is introduced at 1 (from whatever basic or original process utilizes the dimethylformamide as a solvent) into a distillation column 2 of conventional design, at a point therein which is heated to the boiling temperature of the mixture and under atmospheric pressure. A mixture of water and dimethylamine produced by hydrolysis of dimethylformamide within column 2 is withdrawn through line 3 and condensed in condenser 4, whence the condensate is led through line 5 into another distillation column 6. Because of the great difference at boiling points, dimethylamine and water are readily separated in column 6, with the water being withdrawn through 7 substantially free of dimethylamine, while the dimethylamine is recovered from the top of column 6 through line 8 in substantially anhydrous condition and is condensed in condenser 9. Such dimethylamine is led through line 10 to be admixed with the dimethylformamide fraction (also containing formic acid produced by hydrolysis in column 2) withdrawn from the bottom of column 2 through line 11, so that the mixture of dimethylformamide, formic acid, and dimethylamine is led through line 12 for recycling into the basic process in which dimethylformamide is being used as a solvent. In this mixture, the dimethylamine and formic acid react to produce the formate of dimethylamine, which is readily dissolved in the substantially larger quantity of dimethylformamide present, thus neutralizing the formic acid.

As further illustrative of a particular technique embodying and for practicing the invention and with which satisfactory results have been achieved in accordance herewith, one may note the following example, the description of which will also compare results achieved in treating a mixture of dimethylformamide and water and pentane (as another solvent component) by distillation alone, on the one hand, and by treatment following this invention wherein the dimethylamine is returned for admixture with recovered dimethylformamide. In this example, the mixture of water, pentane, and dimethylformamide was provided from the process of extracting a cut of chlorinated paraffins of about 25 mole percent with anhydrous dimethylformamide, after which the extract phase was diluted with about 10% of water and agitated with pentane.

As demonstrating the results obtained when distillation alone (but not the other features of this invention) was used to recover dimethylformamide for re-use, the mixture of dimethylformamide, water, and pentane was introduced into a distillation column with a charge of about 2196.3 grams per hour. A mixture of water and pentane was recovered at the head of the column and was separated by decantation, with the pentane forming, of course, the upper layer which was readily recovered and returned to the original extracting step, while a small part of the water was utilized as reflux in the distillation column. With such a technique, the various products of distillation were recovered as follows: 62.3 grams per hour of pentane, 214.5 grams per hour of water, and 1919.5 grams per hour of dimethylformamide. After about ten cycles during which the dimethylformamide so recovered was returned to the original extraction process, the formic acid component of the recovered dimethylformamide fraction had reached a level of about 1%, thus providing an acidity sufficient to produce rapid corrosive attack on the metal parts of the extraction apparatus. Moreover, the water removed during distillation (which was also recycled into the extraction process) contained significant quantities of dimethylamine, building up to a level of about 2%, as a result of which the addition of pentane in the extraction process was complicated by the formation of emulsions between the solution of chlorinated products in the pentane phase and the phase containing dimethylformamide.

For comparison with the foregoing and as further illustrative of a technique embodying and for practicing this invention, the same mixture of water, pentane, and dimethylformamide was treated, in accordance with FIG. 2, and was introduced through line 13 into distillation column 14 for distillation therein, during which hydrolysis of dimethylformamide occurred. A mixture of water, pentane, and dimethylamine (formed during the hydrolysis) was withdrawn from the head of column 14 through line 15 and condensed in condenser 16 and led through line 17 to a decanter 18, from which was withdrawn through line 19 the supernatant pentane layer for recycling to the original extraction process and, through line 20, a mixture of dimethylamine in water. This latter solution was separated in distillation column 21, with a water phase being recovered through line 22 and containing only about 0.3% of dimethylamine, which water phase was satisfactorily recycled directly into the original extraction process without producing undesired emulsion problems.

From the head of column 21 through line 23 there was withdrawn dimethylamine containing less than about 10% water, which was condensed in condenser 24 and led through line 25 for admixture with the dimethylformamide phase withdrawn at 26 from the bottom of column 14 and containing formic acid produced by the hydrolysis therein. The mixture of recovered dimethylformamide, formic acid, and dimethylamine in line 27 was directly recycled to the original extraction process, and was in a form where the extractive or solvent properties of the dimethylformamide were substantially unaffected, such mixture containing about 1% of the formate of dimethylamine and about 0.1% water (0.05% added with the dimethylamine and 0.05% being retained in the dimethylformamide fraction withdrawn from the bottom of column 14). The foregoing was found to represent an equilibrium condition which was maintained automatically in the recovered dimethylformamide mixture in line 27 after many repeated cycles through such recovery steps, substantially without loss of dimethylformamide and with the resulting mixture being substantially neutral.

As will be apparent from the foregoing, there are provided in accordance herewith methods and techniques for recovering alkylamide solvent materials from mixtures thereof with water and other immiscible solvents substantially without the loss of alkylamide materials and without the disadvantages of acidic components due to hydrolysis of the alkylamides. Quite unexpectedly, the products of the hydrolysis which does occur during distillation have little or no effect on the solvent properties of the alkylamides for their original and intended purposes in solvent extraction processes, etc., and the yields of the various steps hereof are sufficiently quantitative so that amines formed during hydrolysis of the alkylamides directly neutralize carboxylic acids formed during such hydrolysis. Similarly, the amine-acid salt products achieve a certain equilibrium as very minor components of the recovered alkylamide phase which is readily maintained at insignificant levels automatically despite the continued recycling through the original solvent extraction process of the recovered alkylamide phase, the aqueous phase separated during recovery of the alkylamides, and, even, an additional hydrocarbon solvent phase as may be desired for economic and continuous operation of whatever basic or original extraction process utilizes the alkylamide solvent materials in the first place. Similarly, in addition to eliminating or minimizing material losses in the recovery of alkylamide solvents, the techniques in accordance herewith also provide substantially quantitative elimination of difficulties arising from excess acidity due to hydrolysis and/or problems of undesired emulsification of an additional solvent phase because of impurities in the recycled water or alkylamide phases.

While the materials and process steps herein described form preferred embodiments of this invention, this invention is not limited to these particular materials or process steps, and changes may be made therein without departing from the scope of this invention which is defined in the appended claims.

What is claimed is:

1. A method of the character described for separating alkylamide solvents from mixtures with water for re-use as solvents substantially without additional purification treatment, the steps which comprise in combination distilling said alkylamide-water mixture effecting separation of an aqueous distillate and an alkylamide fraction, said distillation also producing hydrolysis of said alkylamide into an alkylamine and a carboxylic acid, withdrawing a mixture of water and said alkylamine produced by said hydrolysis from said distillation step, separately withdrawing from said distillation step an alkylamide fraction which also includes as a minor component said carboxylic acid formed by said hydrolysis, separating said alkylamine from said water withdrawn from said distillation step, and admixing said alkylamine into said alkylamide fraction withdrawn from said distillation step for neutralizing said carboxylic acid component therein and forming a substantially neutral alkylamide solvent fraction for re-use.

2. A method as recited in claim 1 in which said alkylamide-water mixture also contains a water-immiscible organic solvent component, and which method also includes the steps of withdrawing said water-immiscible component with said water and said alkylamine from said distillation step, and separating said water-immiscible component from said water-alkylamine mixture before said alkylamine is separated from said water for admixture into said alkylamide fraction.

3. A method as recited in claim 1 in which said alkylamide solvent is dimethylformamide and in which said alkylamine and carboxylic acid formed during said hydrolysis are, respectively, dimethylamine and formic acid.

4. A method as recited in claim 1 in which said admixture of said alkylamine into said alkylamide fraction including said carboxylic acid neutralizes the latter by reaction of said alkylamine with said acid to form the corresponding salt, and in which admixture equilibrium conditions are established among said alkylamide, said alkIamide, said acid, and said salt whereby the concentration of the latter in said alkylamide fraction remains at a substantially constant minor concentration during repeated cycling of alkylamide-water mixtures through said distillation and hydrolysis steps.

5. A method as recited in claim 4 in which said alkylamide is dimethylformamide and said alkylamine is dimethylamine, said carboxylic acid is formic acid, and said salt is the formate of dimethylamine and formic acid.

6. A method as recited in claim 1 in which said alkylamide-water mixtures are originally produced as effluents from a hydrocarbon extracting process in which said alkylamide is used as an extracting solvent and in which said admixture of recovered alkylamide fraction including said carboxylic acid and said alkylamine is directly recycled substantially without further treatment into said hydrocarbon extracting process.

7. A method as recited in claim 1 in which said alkylamide is selected from the group consisting of formamide, alkylformamides, alkylacetamides, and mixtures thereof.

8. A method as recited in claim 1 in which said alkylamide is one which forms on hydrolysis an alkylamine having a boiling point lower than water.

References Cited

UNITED STATES PATENTS

| | | | |
|---|---|---|---|
| 1,934,485 | 11/1933 | Carlisle | 260—561 |
| 2,204,371 | 6/1940 | Loder | 260—561 |
| 2,048,178 | 7/1936 | Carney | 203—14 X |
| 2,126,600 | 8/1938 | Andrews et al. | 203—59 |
| 2,194,851 | 3/1940 | Guinot | 203—14 |
| 2,375,036 | 5/1945 | Pierotti et al. | 203—59 X |
| 2,570,291 | 10/1951 | Tyerman | 203—59 |
| 3,294,651 | 12/1966 | Pasin | 260—561 |

FOREIGN PATENTS 932,827   7/1963   Great Britain.

NORMAN YUDKOFF, Primary Examiner

F. E. DRUMMOND, Assistant Examiner

U.S. Cl. X.R.

203—38, 87; 260—551